(12) United States Patent
Maeda et al.

(10) Patent No.: US 7,864,897 B2
(45) Date of Patent: Jan. 4, 2011

(54) MIMO MULTIPLEXING COMMUNICATION SYSTEM AND A SIGNAL SEPARATION METHOD

(75) Inventors: Noriyuki Maeda, Yokohama (JP); Hiroyuki Kawai, Yokosuka (JP); Kenichi Higuchi, Yokohama (JP); Mamoru Sawahashi, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 334 days.

(21) Appl. No.: 11/909,607

(22) PCT Filed: Mar. 20, 2006

(86) PCT No.: PCT/JP2006/305601
§ 371 (c)(1), (2), (4) Date: Dec. 4, 2008

(87) PCT Pub. No.: WO2006/101093
PCT Pub. Date: Sep. 28, 2006

(65) Prior Publication Data
US 2009/0213965 A1 Aug. 27, 2009

(30) Foreign Application Priority Data
Mar. 23, 2005 (JP) .............................. 2005-084697

(51) Int. Cl.
*H04L 27/06* (2006.01)
*H04L 23/02* (2006.01)
(52) U.S. Cl. ...................................... 375/341; 375/262
(58) Field of Classification Search ................ 375/262, 375/340, 341, 346, 349; 370/334; 714/794–796
See application file for complete search history.

(56) References Cited
U.S. PATENT DOCUMENTS
7,636,406 B2 * 12/2009 Leshem et al. .............. 375/347
7,720,169 B2 * 5/2010 Reuven et al. .............. 375/267
(Continued)

FOREIGN PATENT DOCUMENTS
EP 1439677 A1 7/2004
(Continued)

OTHER PUBLICATIONS
Japanese Office Action for Application No. 2005-084697, mailed on Sep. 17, 2009 (6 pages).
(Continued)

*Primary Examiner*—Khanh C Tran
(74) *Attorney, Agent, or Firm*—Osha • Liang LLP

(57) ABSTRACT

A disclosed receiver in a MIMO multiplexing communication system, in which plural signals are simultaneously transmitted from plural transmitting antenna branches using the same frequency, and the transmitted signals are retrieved by receiving signals at plural receiving antennas, separating the received signals and searching for proper symbol metrics for each branch, comprises a QR decomposer for QR decomposing the received signals to orthogonalize the transmitted signals; a symbol replica candidate ranking unit for subtracting surviving symbol replica candidates from the QR decomposed received signals to get remaining received signals and rank the remaining signals in the increasing order of expected branch metrics of the remaining received signals; a symbol replica candidate selector for selecting symbol replica candidates in the ranked order; a branch metric calculator for calculating the branch metrics of the selected symbol replica candidates; and a threshold comparator for comparing the calculated branch metrics with a predetermined threshold; wherein if a calculated branch metric is larger than the predetermined threshold, the branch metric and successive branch metrics are deleted without further searching.

9 Claims, 17 Drawing Sheets

U.S. PATENT DOCUMENTS

| | | |
|---|---|---|
| 2003/0076890 A1 | 4/2003 | Hochwald et al. |
| 2003/0236076 A1 | 12/2003 | Brunel |
| 2004/0181419 A1 | 9/2004 | Davis et al. |
| 2004/0228423 A1 | 11/2004 | Gueguen |
| 2006/0274836 A1* | 12/2006 | Sampath et al. ............. 375/242 |
| 2006/0285531 A1* | 12/2006 | Howard et al. ............. 370/343 |
| 2007/0153748 A1* | 7/2007 | Shapira ..................... 370/338 |
| 2007/0291882 A1* | 12/2007 | Park et al. ................... 375/347 |
| 2008/0232484 A1* | 9/2008 | Budianu et al. ............. 375/260 |
| 2010/0157785 A1* | 6/2010 | Song et al. ................. 370/203 |

FOREIGN PATENT DOCUMENTS

| | | |
|---|---|---|
| EP | 1460813 A1 | 9/2004 |
| JP | 2000-316152 A | 11/2000 |
| JP | 2002-164790 A | 6/2002 |
| JP | 2004-282757 A | 10/2004 |
| TW | 200503460 | 1/2005 |
| TW | 200511753 | 3/2005 |

OTHER PUBLICATIONS

Hiroyuki Kawai, Kenichi Higuchi, Noriyuki Maeda, Mamoru Sawahashi, "Adaptive Selection Method of Surviving Symbol Replica Candidates Applying Independent Control of Number of Surviving Symbol Replica Candidates at each State in QRM-MLD for OFDM MIMO Multiplexing", Technical Search Report of IEICE (The Institute of Electronics, Information and Communication Engineers), Nov. 11, 2004, vol. 104, No. 439, pp. 61-66.

Noriyuki Maeda, Hiroyuki Kawai, Jyunichiro Kawamoto, Kenichi Higuchi, Mamoru Sawahashi, "Performance of Adaptive Selection Algorithm of Surviving Symbol Replica Candidates in QRM-MLD for MIMO Multiplexing Using OFCDM Wireless Access", Technical Search Report of IEICE (The Institute of Electronics, Information and Communication Engineers), Jul. 9, 2004, vol. 104, No. 184, pp. 19-24, NS-2004-72.

B.M. Hochwald et al, "Achieving Near-Capacity on a Multiple-Antenna Channel," IEEE Transactions on Communications, vol. 51, No. 3, pp. 389-399, Mar. 2003, 11 pages.

International Search report issued in PCT/JP2006/305601 mailed Jun. 13, 2006, with English translation, 5 pages.

Noriyuki Maeda, et al. "OFDM MIMO Taju ni Okeru Shinraido Joho ni Motoduku Tekio Ikinokori Symbol Replica Koho Sentaku o Tekiyo shita Sphere decoding Ho," IEICE Technical Report, Nov. 18, 2004, vol. 104, No. 439, RCS 2004-222, (pp. 67 to 72), 6 pages.

H. Kawai et al., "Independent Adaptive Control of Surviving Symbol Replica Candidates at each Stage Based on Minimum Branch Metric in QRM-MLD for OFCDM MIMO Multiplexing," Sep. 26, 2004, Proceedings of VTC2004-Fall, (pp. 1558 to 1564), vol. 3, 7 pages.

K. Higuchi et al., "Adaptive Selection of Surviving Symbol Replica Candidates Based on Maximum Reliability in QRM-MLD for OFCDM MIMO Multiplexing," Nov. 29, 2004, Proceedings of Globecom 2004 (pp. 2480-2486), vol. 4, 7 pages.

Taiwanese Office Action for Application No. 095109843, mailed on Sep. 29, 2009 (13 pages).

\* cited by examiner $$\underbrace{\begin{bmatrix} z_4 \\ z_3 \\ z_2 \\ z_1 \end{bmatrix}}_{Q^H y} = \underbrace{\begin{bmatrix} r_{11} & r_{12} & r_{13} & r_{14} \\ 0 & r_{22} & r_{23} & r_{24} \\ 0 & 0 & r_{33} & r_{34} \\ 0 & 0 & 0 & r_{44} \end{bmatrix}}_{R} \underbrace{\begin{bmatrix} x_4 \\ x_3 \\ x_2 \\ x_1 \end{bmatrix}}_{x}$$

260

| SYMBOL REPLICA CANDIDATE #1 |
| SYMBOL REPLICA CANDIDATE #2 |
| ⋮ |
| SYMBOL REPLICA CANDIDATE #$N_{cand}$ |

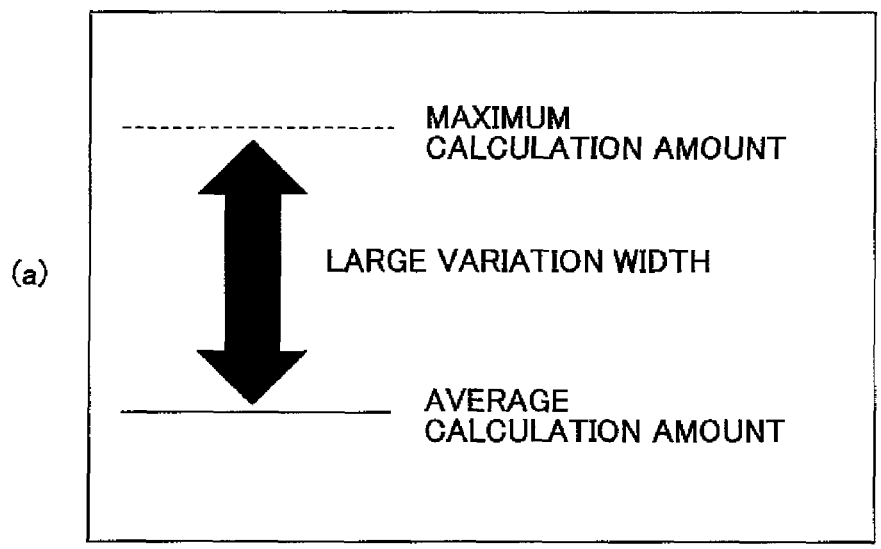
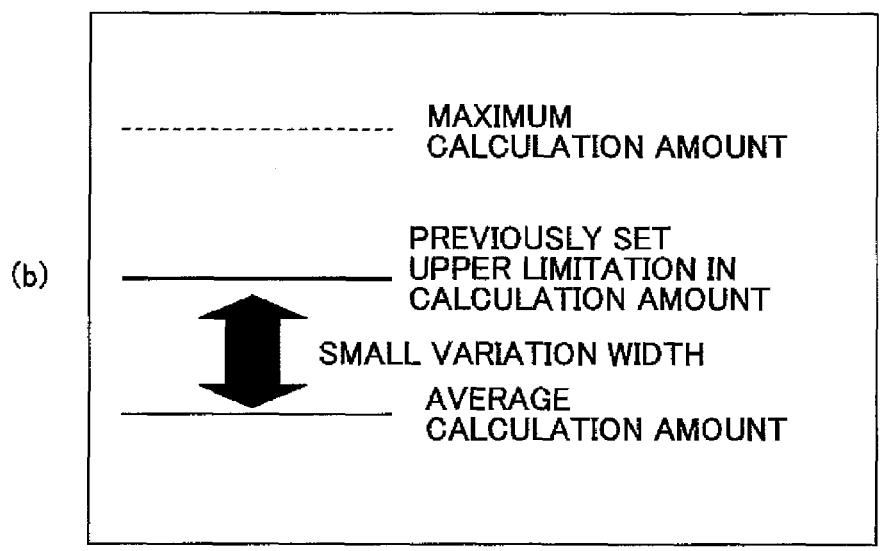
FIG.18

MIMO MULTIPLEXING COMMUNICATION SYSTEM AND A SIGNAL SEPARATION METHOD

BACKGROUND OF THE INVENTION

1. Field of the Invention

The present invention generally relates to receivers in MIMO multiplexing communication system and signal separation methods, and especially relates to such a receiver and method employing LSD (List Sphere Decoding) method with adaptive selection of surviving symbol replica candidates.

2. Description of the Related Art

MIMO (Multiple Input Multiple Output) spatial multiplexing is one technology to realize large capacity and high speed data communications. FIG. 1 schematically illustrates a general structure of a MIMO multiplexing system 10. In the MIMO multiplexing system 10, a transmitter 100 transmits plural different signals or data via plural different antenna branches 101, 102, . . . , using the same frequency, time and/or code. A receiver 200 receives spatially multiplexed plural different signals via antennas 201, 202, . . . , and separates the received signals to retrieve the transmitted signals or data. Since the MIMO multiplexing system can transmit and receive different data simultaneously, it can drastically increase information bit rate.

Some signal separation schemes have been proposed for the MIMO multiplexing. Among them, the maximum likelihood of detection (MLD) method is desirable, because the MLD method has excellent signal separation characteristics, and can reduce a required signal energy per bit-to-noise power spectrum density ratio ($E_b/N_o$) and therefore realize high throughput. In the MLD method, however, it is necessary to calculate the branch metrics (squared Euclidean distances) of all possible symbol replica candidates with respect to all the transmission branches (transmitted signals), and therefore the calculation amount and complexity is extremely large. In the MLD, the transmitted signals can be retrieved on the assumption that a combination of symbol replica candidates giving the minimum branch metrics is the correct combination of the transmitted signals. It is desired to reduce the calculation amount and complexity for the actual implementation of the MLD method.

As one promising approach that reduces the calculation amount in the MLD method, the List Sphere Decoding (LSD) method has been proposed. In the LSD method, the QR decomposition technique is used to orthogonalize the transmitted signals (into a condition where each received signal includes only a specific transmitted signal component(s) but not other transmitted signal components, as shown in FIG. 2). A suitable threshold is previously established. The transmitted signals or transmission branches are sorted or ranked in the decreasing order of their received SINRs (Signal to Interference plus Noise power Ratios). The branch metrics of symbol replica candidates with respect to the transmission branches are compared with the threshold, in the decreasing order of their received SINRs. In accordance with a result of the comparison, the symbol replica candidates with respect to the lower ranked transmitted signals (See Non-Patent Document #1) are deleted.

The QR decomposition is described below in more detail. Assuming that the transmitted signals are represented by x (x1, x2, x3 and x4 where four transmission antenna branches are used) and the received signals are represented by y (y1, y2, y3 and y4 where four receiving antennas are used), the received signals can be represented by the following equation (1).

$$y = Hx \quad (1)$$

H is a channel matrix that can be obtained by performing channel estimation in the receiver using known orthogonal pilot signals multiplexed with the transmission signals. The orthogonal pilot signals are multiplexed to the transmitted signal by any of or a combination of time division multiplexing, frequency division multiplexing, and code division multiplexing.

A unitary matrix Q and an upper triangular matrix R satisfying the following equation (2) are determined.

$$H = QR \quad (2)$$

The above equation (1) can be represented by the following equation (3) using QR.

$$y = Hx = QRx \quad (3)$$

The Hermitian transposed matrix $Q^H$ of the matrix Q is multiplied to both sides of the equation (3) from the left to get the following equation (4).

$$Q^H y = Q^H Q R x = Rx \quad (4)$$

An equation shown in FIG. 2 indicates the components $x_1$, $x_2$, $x_3$ and $x_4$ of the transmitted signals x and the components $z_1$, $z_2$, $z_3$ and $z_4$ of the received signals $Q^H y$ obtained by orthogonalizing the transmitted signals x. For example, since the component $z_1 = r_{44} x_1$, it includes only the component $x_1$ but not other components of x. The component $z_2$ includes only the components $x_1$ and $x_2$. This condition is referred to as "orthogonal" herein.

As for the received signals z by thus orthogonalizing the transmitted signals x using the upper triangular matrix R, the branch metric with respect to each symbol replica candidate (S1, S2, S3, S4, S5, S6, . . . ) for each transmitted signal ($x_1$, $x_2$, $x_3$, $x_4$) transmitted at the antenna branch 101 is compared with the threshold by turns. In accordance with the comparison result (e.g. a solid line white circle S1 for x1 at stage 1 shown in FIG. 3 is larger than the threshold), lower ranked symbol replica candidates (e.g. the following symbol replica candidates represented by four dotted line white circles at stage 2) for the transmitted signals (e.g. x2 at stage 2 shown in FIG. 3) are deleted to reduce the calculation amount. Each stage corresponds to each transmitting antenna branch, therefore to each transmitted signal. By deciding symbol replica candidates at each stage, the transmitted signal is retrieved at each antenna branch.

FIG. 3 schematically illustrates the branch metric calculation and comparison procedure of the above described LSD method under a condition where the QPSK (Quadrature Phase Shift Keying) modulation and 2×2 MIMO multiplexing are employed. Solid and dotted line white circles represent symbol replica candidates that have been deleted according to the comparison with the threshold. Black circles represent surviving symbol replica candidates. In this example, the calculation and comparison procedure starts at step S1, goes through steps S2, S3, S4, S5, S6, S7, S8, S9, S10 and S13, and ends at step S12.

[Non-patent Document #1]

B. M. Hochwald, et al., "Achieving near-capacity on multiple-antenna channel," IEEE Trans. Commun., vol. 51, no. 3, pp. 389-399, March 2003.

Description of the Invention

Problem(s) to be Solved by the Invention

The conventional LSD method performs the above explained operation, and can reduce the calculation amount compared with the MLD method. The LSD method, however, has a problem that its calculation amount is still large for the actual implementation. That is, all symbol replica candidates (e.g. S3, S4, S5, S6, S9, S10, S13, S12) added at the next stage need branch metric calculations, and therefore there has been a limitation in reducing the calculation amount.

FIG. 4 illustrates a branch metric calculation and comparison procedure at a stage m+1 in the conventional LSD method in case of 16QAM (Quadrature Amplitude Modulation). At the stage m+1, all 16 symbol replica candidates need their branch metric calculations. Although some symbol replica candidates (represented by white circles, S1, S3, ... ) should be deleted as a result of comparisons with the threshold, the branch metric calculation should be performed even for such symbol replica candidates to be deleted, and therefore the calculation amount cannot be effectively further reduced.

SUMMARY OF THE INVENTION

The present invention provides a receiver in a MIMO multiplexing communication system and a signal separation method based on the LSD method that can further reduce the calculation amount.

Features of the present invention are set forth in the description that follows, and in part will become apparent from the description and the accompanying drawings, or may be learned by practice of the invention according to the teachings provided in the description. Problem solutions provided by the present invention will be realized and attained by a method and system particularly pointed out in the specification in such full, clear, concise, and exact terms as to enable a person having ordinary skill in the art to practice the invention.

To achieve these solutions and in accordance with the purpose of the invention, as embodied and broadly described herein, the invention provides a specific method and system as follows.

Means for Solving the Problem

An aspect of the present invention provides a receiver in a MIMO multiplexing communication system in which plural signals are simultaneously transmitted from plural transmitting antenna branches using the same frequency, and the transmitted signals are retrieved by receiving the signals at plural receiving antennas, separating the received signals and searching for proper symbol metrics for each branch, comprising: a QR decomposer for QR decomposing the received signals to orthogonalize the transmitted signals; a symbol replica candidate ranking unit for subtracting surviving symbol replica candidates from the QR decomposed received signals to get remaining received signals and rank the remaining signals in the increasing order of expected branch metrics of the remaining received signals; a symbol replica candidate selector for selecting symbol replica candidates in the ranked order; a branch metric calculator for calculating the branch metrics of the selected symbol replica candidates; and a threshold comparator for comparing the calculated branch metrics with a predetermined threshold; wherein if a calculated branch metric is larger than the predetermined threshold, the branch metric and successive branch metrics are deleted without further searching.

In the receiver, the symbol replica candidate ranking unit may perform quadrant detection by determining in which quadrant of an orthogonal coordinate of a signal layout the remaining signal exists, repeating the determination by narrowing an area of the quadrant detection, getting a spatial relationship of the remaining signal in the signal layout and determining branch metric size based on the spatial relationship.

According to another aspect of the invention, when it is determined that a branch metric is larger than the threshold, further searching for a predetermined number of candidates is performed rather than terminating immediately.

According to another aspect of the invention, symbol replica candidates whose branch metrics are smaller than the threshold are input into a list, and after the list is full, a new symbol replica candidate to be added to the list is compared with the symbol replica candidate in the list having the largest branch metric, and if the former is smaller than the latter then the former replaces the latter and the threshold is revised to the largest branch metric.

According to another aspect of the invention, symbol replica candidates whose branch metrics are smaller than the threshold are input into a list, and after the list is full, a new symbol replica candidate to be added to the list is compared with the symbol replica candidate in the list having the largest branch metric, and if the former is smaller than the latter then the former replaces the latter and a predetermined number of the replaced candidates are still held in the list.

According to another aspect of the invention, the searching for symbol replica candidates is terminated when a predetermined calculation amount is reached.

According to another aspect of the invention, the receiver further comprises: a channel estimator for performing channel estimation based on orthogonal pilot signals contained in the received signals; a transmitted signal ranking unit for ranking the transmitted signals in the decreasing order of their received SINR based on the channel estimation.

According to another aspect of the invention, the orthogonal pilot signals are multiplexed with the transmitted signal by any of or a combination of time division multiplexing, frequency division multiplexing, and code division multiplexing.

According to another aspect of the invention, a signal separation method in a MIMO multiplexing communication system, in which plural signals are simultaneously transmitted from plural transmitting antenna branches using the same frequency, and the transmitted signals are retrieved by receiving signals at plural receiving antennas, separating the received signals and searching for proper symbol metrics for each branch, comprises the steps of: QR decomposing the received signals to orthogonalize the transmitted signals; subtracting surviving symbol replica candidates from the QR decomposed received signals to get remaining received signals; ranking the remaining signals in the increasing order of expected branch metrics of the remaining received signals; selecting symbol replica candidates in the ranked order; calculating the branch metrics of the selected symbol replica candidates; and comparing the calculated branch metrics with a predetermined threshold; wherein if a calculated branch metric is larger than the predetermined threshold, the branch metric and successive branch metrics are deleted without further searching.

Advantage of the Invention

According to embodiments of the present invention, it is possible to further reduce the calculation amount.

BRIEF DESCRIPTION OF THE DRAWINGS

FIG. 18 schematically illustrates widths of variations in calculation amounts.

Figure 1:
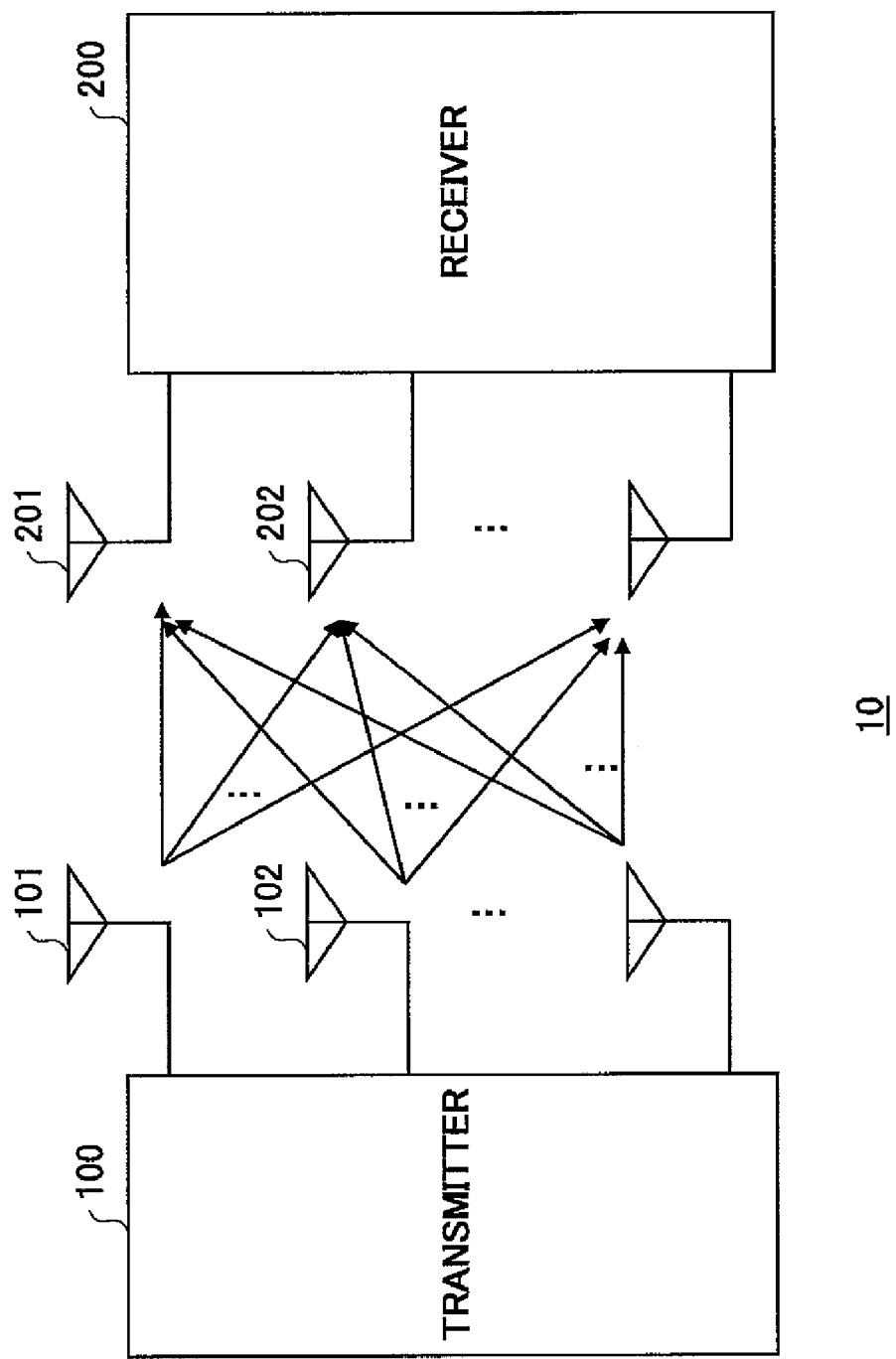
FIG. 1 schematically illustrates a general structure of a MIMO multiplexing system.
Figures 2, 3:
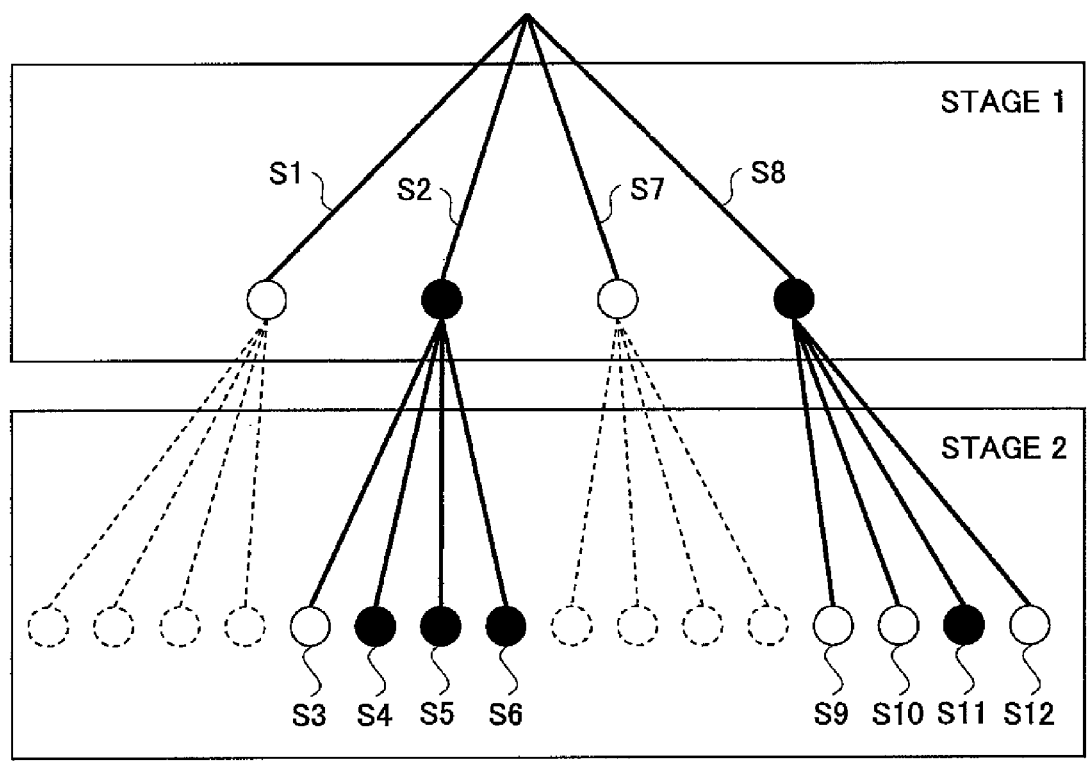
FIG. 2 depicts an example of orthogonalizing transmitted signals using the QR decomposition.
FIG. 3 schematically illustrates a branch metric calculation and comparison procedure in a conventional LSD method.
Figure 4:
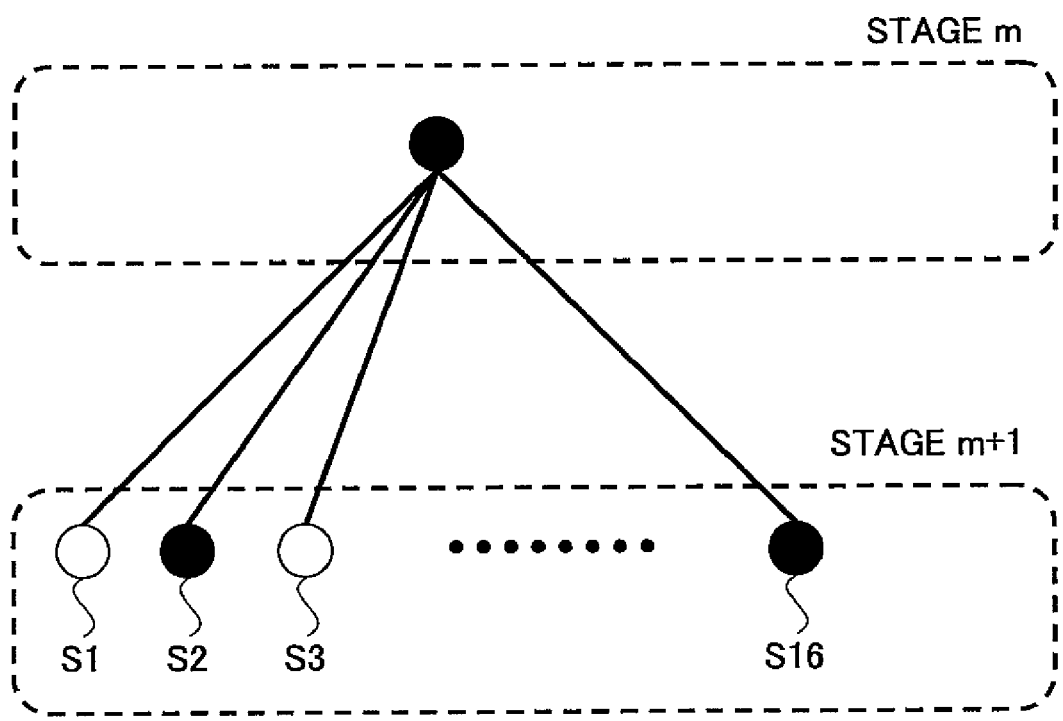
FIG. 4 schematically illustrates a branch metric calculation and comparison procedure at a stage m+1 in a conventional LSD method.

100 transmitter
101~104 antenna
111~114 orthogonal pilot signal multiplexer
200 receiver
201~204 antenna
210 channel estimator
220 transmitted signal ranking unit
230 QR decomposer
240 $Q^H$ multiplier
250 LSD processor
251 symbol replica candidate ranking unit
252 symbol replica candidate selector
253 branch metric calculator
254 threshold comparator
260 list
P1~P4 pilot signals
30 signal point layout for signal point detection in quadrant detection method
31 surviving received signal

DESCRIPTION OF THE PREFERRED EMBODIMENTS

In the following, preferred embodiments of the present invention are explained below.

Figure 5:
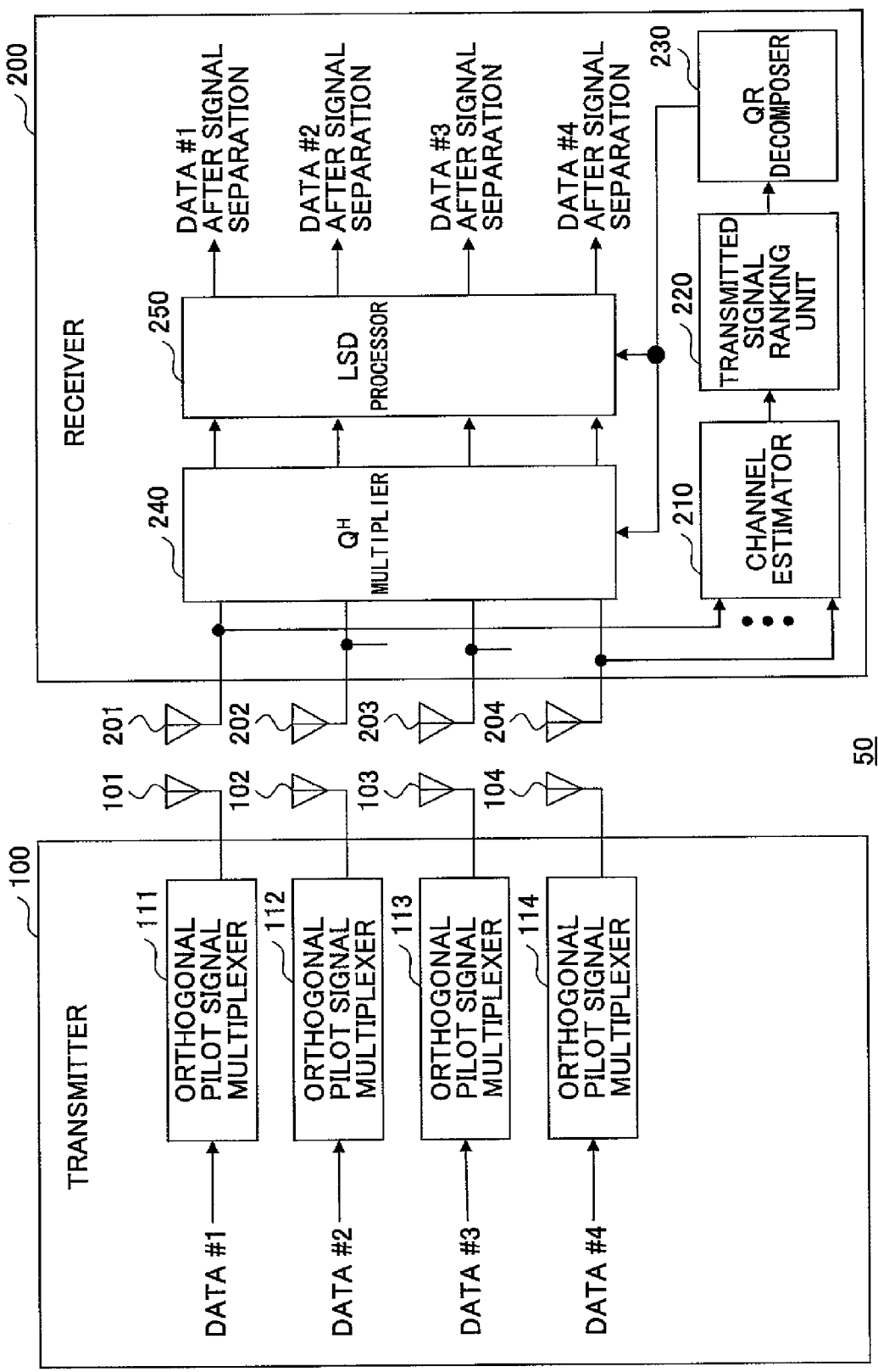
FIG. 5 schematically illustrates a general structure of a MIMO multiplexing communication system according to one embodiment of the present invention.

FIG. 5 schematically illustrates a general structure of a MIMO multiplexing communication system 50 according to one embodiment of the present invention. The MIMO multiplexing communication system 50 has four antennas in both transmitting side and receiving side, but the number of antennas is not limited to four.

A transmitter 100 shown in FIG. 5 includes orthogonal pilot signal multiplexers 111~114 that multiplex data #1~#4 to be transmitted and orthogonal pilot signals. The transmitter 100 further includes four antennas 101~104 connected to the orthogonal pilot signal multiplexers 111~114, respectively.

A receiver 200 includes antennas 201~204 for receiving signals, and a channel estimator 210 for performing channel estimation (generating a channel matrix) based on orthogonal pilot signals contained in the received signals. The receiver 200 further includes a transmitted signal ranking unit 220 that ranks or sorts the transmitted signals by their received SINRs, based on channel estimation results. The transmitted signals are ranked from one with the highest received SINR to one with the lowest received SINR. The receiver 200 further includes a QR decomposer 230 that performs the QR decomposition to orthogonalize the transmitted signals, a $Q^H$ multiplier 240 that multiplies the Hermitian transposed matrix $Q^H$ with the signals received by the antennas 201~204, and an LSD processor 250 that performs signal separation on the received signals multiplied by QH, based on the LSD method. The ranking process in the transmitted signal ranking unit 220 is performed so that the received SINR of each antenna is compared with the others and the row components of the channel matrix are sorted or reordered from lower received SINR to higher received SINR. By searching for symbol replica candidates using thus ranked transmitted signals, the probability of searching for and finding symbol replica candidates whose branch metrics are larger than a threshold is reduced, and therefore the calculation amount can be reduced.

Figure 6:
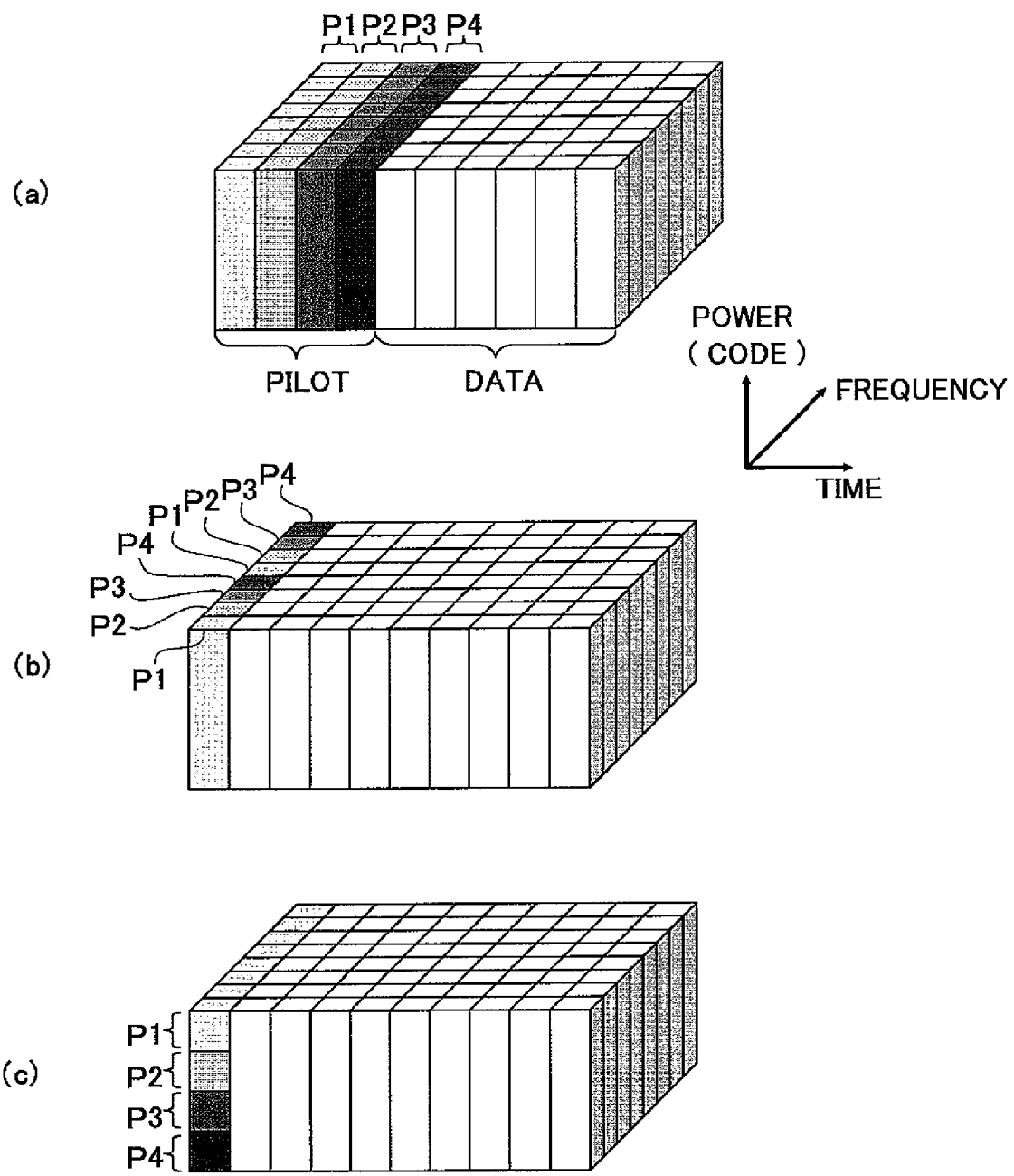
FIG. 6 illustrates three example ways for multiplexing pilot signals.

FIG. 6 illustrates three example ways for multiplexing pilot signals. FIG. 6(a) shows an example way in which pilot signals P1~P4 are time multiplexed. FIG. 6(b) shows an example way in which pilot signals P1~P4 are frequency multiplexed.

FIG. 6(c) shows an example way in which pilot signals P1~P4 are code multiplexed. A combination of these multiplexing ways can be also employed.

Figure 7:
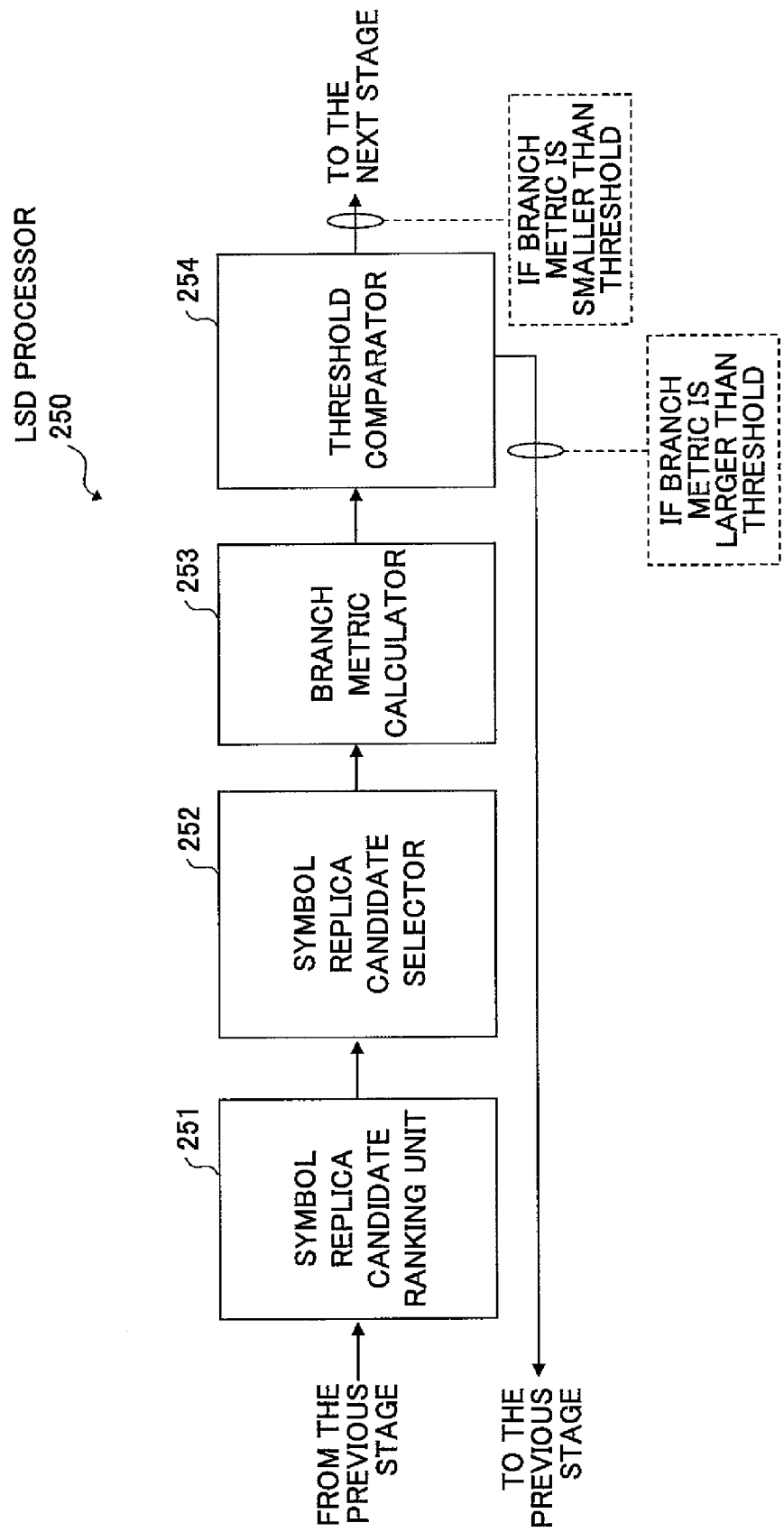
FIG. 7 illustrates a structure example of an LSD processing unit according to the embodiment of the present invention.

FIG. 7 illustrates a structural example for one stage provided with the LSD processor 250 included in the receiver 200 shown in FIG. 5. Plural functions as shown in FIG. 7 can be provided exclusively for plural stages, respectively. Alternatively, only one function can be provided and can be shared among the stages by varying parameters.

The LSD processor 250 shown in FIG. 7 includes a symbol replica candidate ranking unit 251, in which from the received signals (received signals after multiplying by $Q^H$) obtained by orthogonalizing the transmitted signals by the QR decomposition, the signal components of the surviving symbol replica candidates are subtracted, to obtain remaining received signals, and the remaining received signals are ranked or sorted by their expected branch metrics, from smaller branch metric to larger branch metric.

The LSD processor 250 further includes a symbol replica candidate selector 252, in which symbol replica candidates are selected with respect to the sorted received signals in the order from the highest ranked received signal (with the smallest expected branch metric) to the lowest ranked received signal (with the largest expected branch metric).

The LSD processor 250 further includes a branch metric calculator 253, in which the branch metrics of the selected symbol replica candidates are calculated.

The LSD processor 250 further includes a threshold comparator 254, in which the calculated branch metrics are compared with a predetermined threshold.

If the comparison in the threshold comparator 254 results in the branch metric of a symbol replica candidate being smaller than the predetermined threshold, the procedure moves to the next stage (corresponding to the next transmitting branch). On the other hand, if the branch metric of a symbol replica candidate is larger than the predetermined threshold, no further searching with respect to this symbol replica candidate is performed, all the symbol replica candidates after the present stage are deleted, and the procedure goes back to the previous stage to try a fresh combination of symbol replica candidates.

Figure 8:
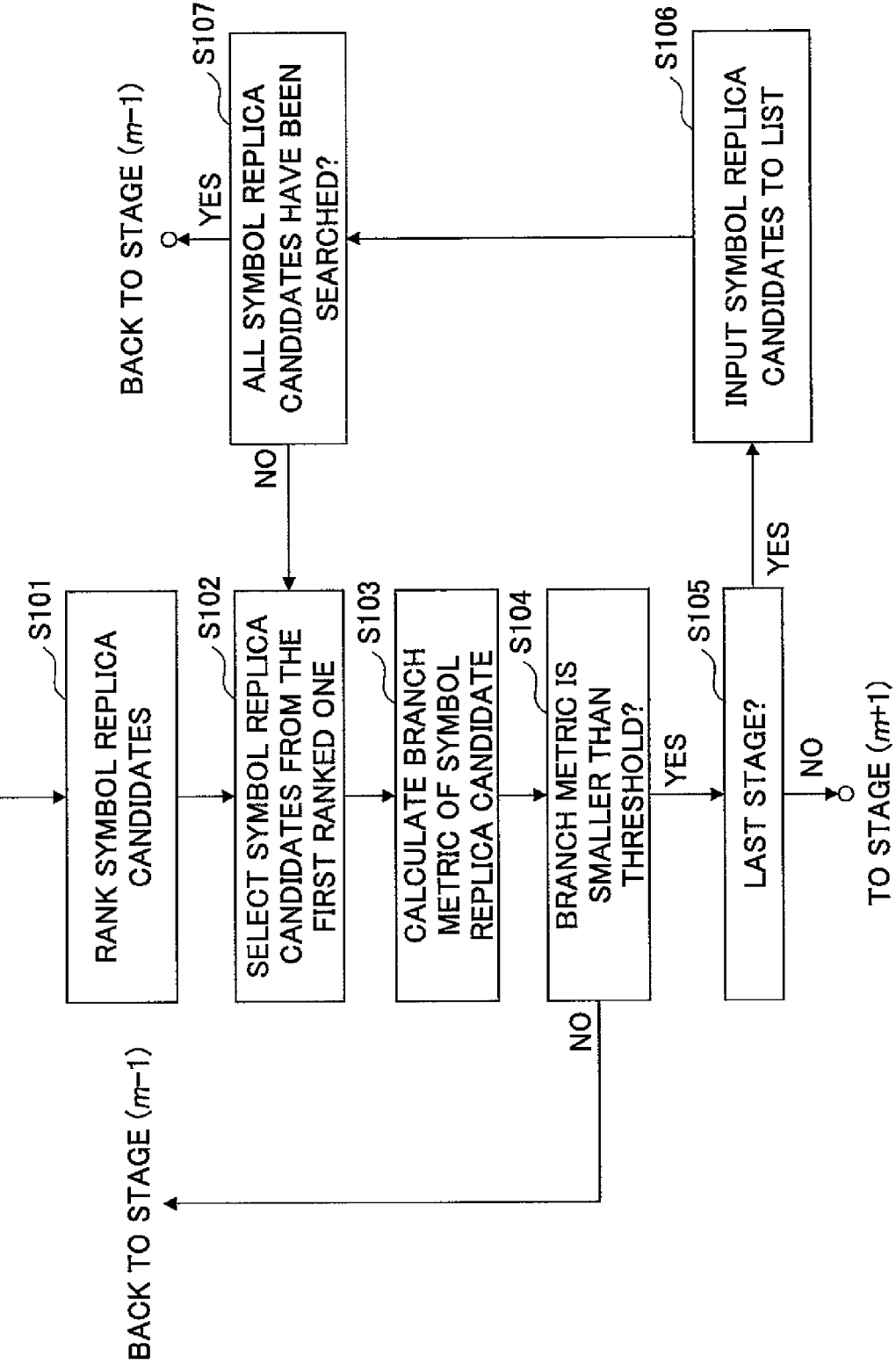
FIG. 8 is a flowchart showing one example procedure in the LSD processing unit.

FIG. 8 is a flowchart showing one example procedure in the LSD processor 250, whose operation is explained below with reference to FIG. 8.

At stage m after coming from the previous stage m−1, first, the ranking of all the symbol replica candidates in the stage m is performed at step S101. Next, symbol replica selection is performed from the first ranked symbol replica candidate at step S102, and the branch metric of the selected symbol replica candidate is calculated at step S103.

Then, the calculated branch metric is compared with a threshold and it is determined whether the calculated branch metric is smaller than the threshold at step S104. If it is determined that the calculated branch metric is larger than the threshold, the procedure goes back to stage m−1. On the other hand, if it is determined that the calculated brand metric is smaller than the threshold, the procedure moves to step S105 where it is determined whether the present stage is the final stage. If the present stage is not the final one, the procedure moves to the next stage m+1.

If the present stage is the last one, the symbol replica candidates are input to a list at step S106. The list holds some symbol replica candidates to perform soft-decision turbo decoding later. Then, it is determined whether all the symbol replica candidates have been searched for and found at the present stage m at step S107. If not, the procedure goes back to the symbol replica candidate selection at step S102. If all the symbol replica candidates have been searched for and found at the present stage m, the procedure goes back to previous stage m−1.

Figure 9:
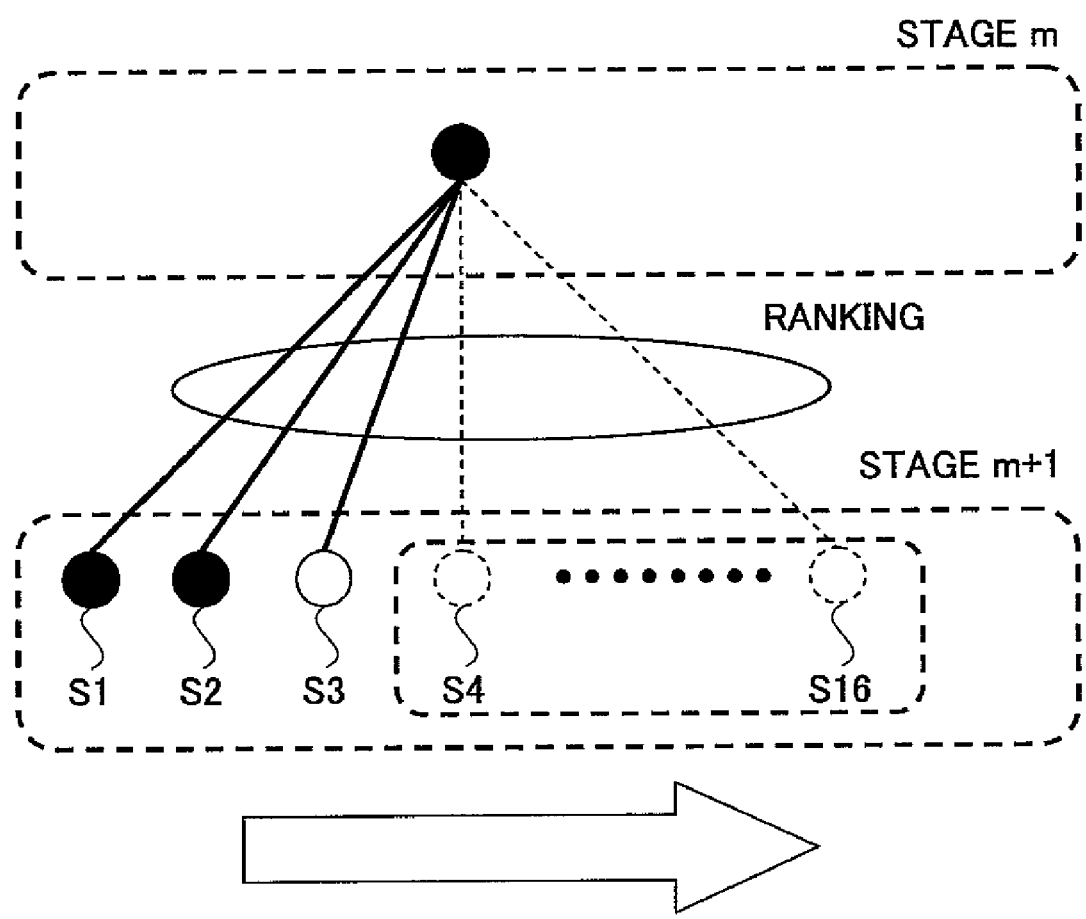
FIG. 9 schematically illustrates a branch metric calculation and comparison procedure at a stage m+1 according to the embodiment of the present invention.

FIG. 9 schematically illustrates ranking, branch metric calculation and comparison procedures at stage m+1 according to the embodiment of the present invention in case of 16QAM. At stage m+1, the procedure goes to step S1 where the branch metric calculation and the threshold comparison are performed, goes to step S2 where the branch metric calculation and the threshold comparison are performed, and goes to step S3. If it is determined that the calculated branch metric is larger than the threshold at step S3, it is possible to omit the following steps S4~16, that drastically reduce the calculation amount.

Figure 10:
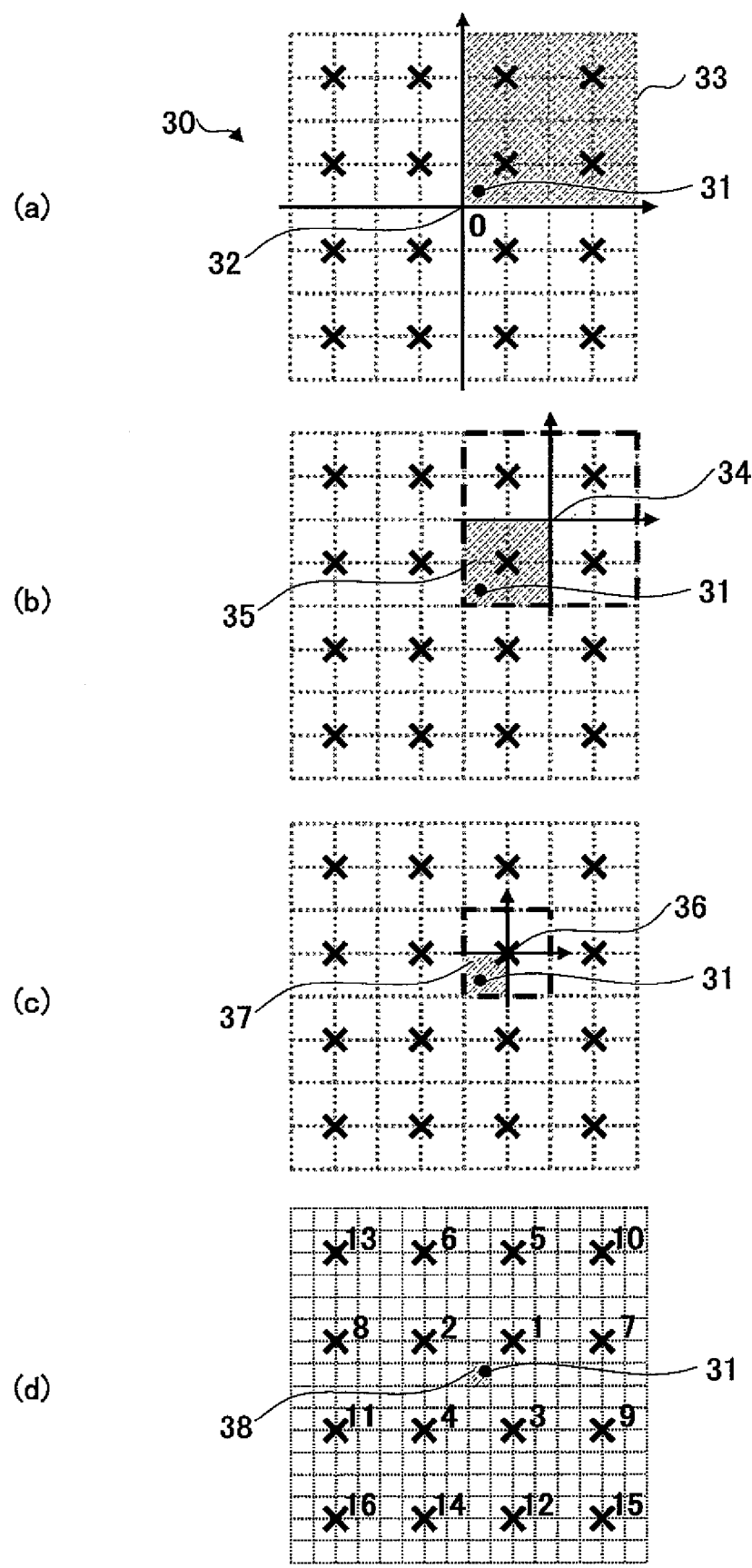
FIG. 10 illustrates an example of ranking symbol replica candidates based on quadrant detection.

Next, FIG. 10 illustrates an example of tanking symbol replica candidates based on quadrant detection according to another embodiment of the present invention. This ranking is performed in the symbol replica candidate ranking unit 251 shown in FIG. 7. Marks x shown in FIG. 10 represent constellations corresponding to symbol replica candidates. Sixteen constellations are shown in the case of 16QAM.

First, as shown in FIG. 10($a$), a detection region is defined as the whole region of a signal layout 30 comprising all quadrants of the complex plane. Assuming orthogonal coordinates whose origin 32 coincides with the center of the signal layout 30, it is determined in which quadrant a remaining received signal 31 exists. Since the quadrant detection is achieved by checking the signs of the I and Q components of the remaining received signal, this process can be much less complex than calculating the squared Euclidian distance. In this example shown in FIG. 10($a$), it is determined that the remaining received signal 31 exists in the first quadrant 33.

Next, a new detection region is defined as the determine d first quadrant 33. Orthogonal coordinates are placed so that their origin 34 coincides with the center of the determined first quadrant 33 as shown in FIG. 10($b$). It is determined in which quadrant of the determined first quadrant 33 the remaining received signal 31 exists. In this example, it is determined that the remaining received signal 31 exists in the third quadrant 35.

Similarly, a new detection region is defined as the determined third quadrant 35. Orthogonal coordinates are placed so that their origin 36 coincides with the center of the determined first quadrant 35 as shown in FIG. 10($c$). It is determined in which quadrant of the determined third quadrant 35 the remaining received signal 31 exists. In this example, it is determined that the remaining received signal 31 exists in the third quadrant 37.

Finally, as shown in FIG. 10($d$), the region 38 where the remaining received signal 31 is located is identified or specified. Each constellation, that is, each symbol replica candidate is ranked based on a spatial relationship with the identified region 38.

The detection regions and how to place orthogonal coordinates can be varied in the scope of the present invention.

In this manner, it is possible to perform ranking only by simply checking the signs of the I and Q components of the remaining received complex signals.

Figure 11:
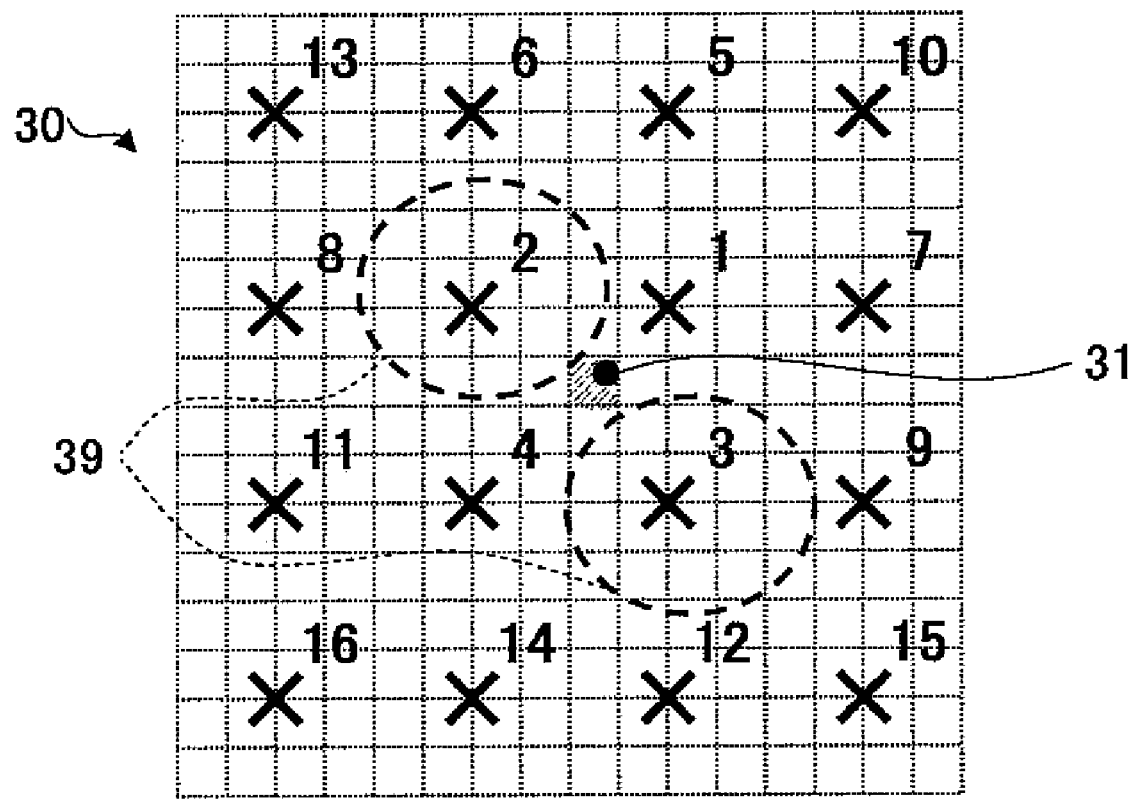
FIG. 11 shows an example of the same ranking in the quadrant detection.
Figure 12:
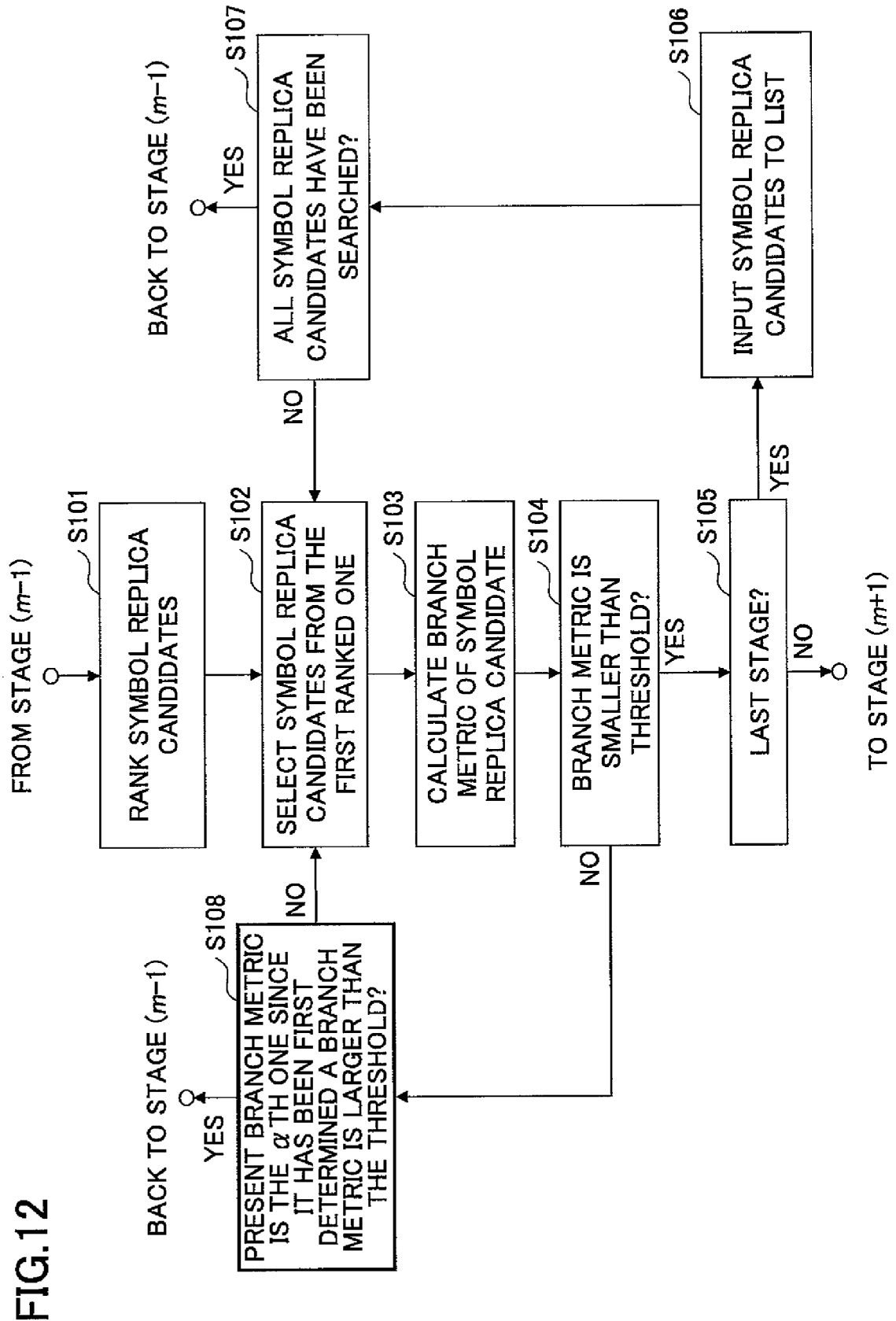
FIG. 12 is a flowchart showing another example procedure in the LSD processing unit.
Figures 13, 14:
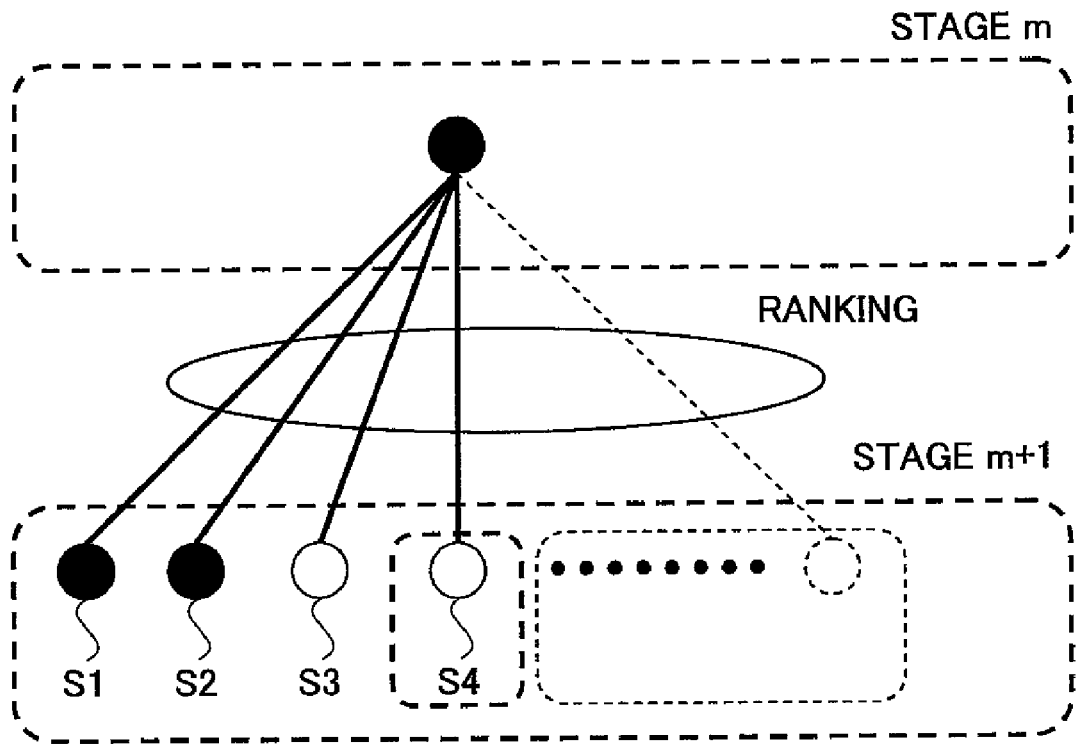
FIG. 13 schematically illustrates a branch metric calculation and comparison procedure taking account of the same ranking.
FIG. 14 shows an example list holding symbol replica candidates surviving at the last stage.

Next, FIGS. 11~13 illustrate an improvement feature for dealing with the same ranking. In FIG. 11, although two symbol replica candidates 39 encircled by dotted lines on the signal layout 30 rank "2" and "3", they should have substantially the same ranking because they have the same spatial relationship with the remaining received signal 31. In this case, according to the procedure shown in FIGS. 8 and 9, the branch metric for the symbol replica candidate ranking "2" is calculated and compared with the threshold, and if the branch metric is determined to be larger than the threshold, the next symbol replica candidate ranking "3" is deleted. However, the symbol replica candidate ranking "3" may be smaller than the threshold in which case it should survive. In that case, deletion of such a symbol replica candidate may cause the degradation of successive decoding characteristics. In order to solve this problem, a scheme shown in FIGS. 12 and 13 is proposed.

FIG. 12 is a flowchart showing another example procedure in the LSD processing unit 250. In this example, there is a new determination step S108 through which the procedure passes on the way to stage (m−1) after leaving step S104. At step S108, it is determined how many branch metrics have been compared since it has been first determined a branch metric is larger than the threshold. At step S10, it is determined whether the present branch metric is the $\alpha$th one since it has been first determined a branch metric is larger than the threshold. If the present branch metric reaches the $\alpha$th one, the procedure goes back to stage m−1. If not, the procedure goes to step S102, where a symbol replica candidate is selected.

FIG. 13 schematically illustrates a branch metric calculation and comparison procedure at stage m+1 according to the above example, wherein the 16QAM is employed and $\alpha=2$. The procedure goes from step S1, S2, . . . for each of 16 symbol replica candidates at stage m+1. Even if it is determined that the branch metric is larger than the threshold, the searching is not terminated then. At the next step S4, a branch metric calculation and comparison with the threshold are performed for the next symbol replica candidate. If it is determined at step S4 that the branch metric is larger than the threshold, the branch metric at step S4 should be αth one since it has been first determined that the branch metric (at step S3) is larger than the threshold, and therefore the following steps are omitted.

In this manner, by performing branch metric calculation and comparison with some margin or redundancy, it is possible to prevent deleting a potentially effective symbol replica candidate and degrading the characteristics, at the cost of a small increase in the calculation amount.

Figure 15:
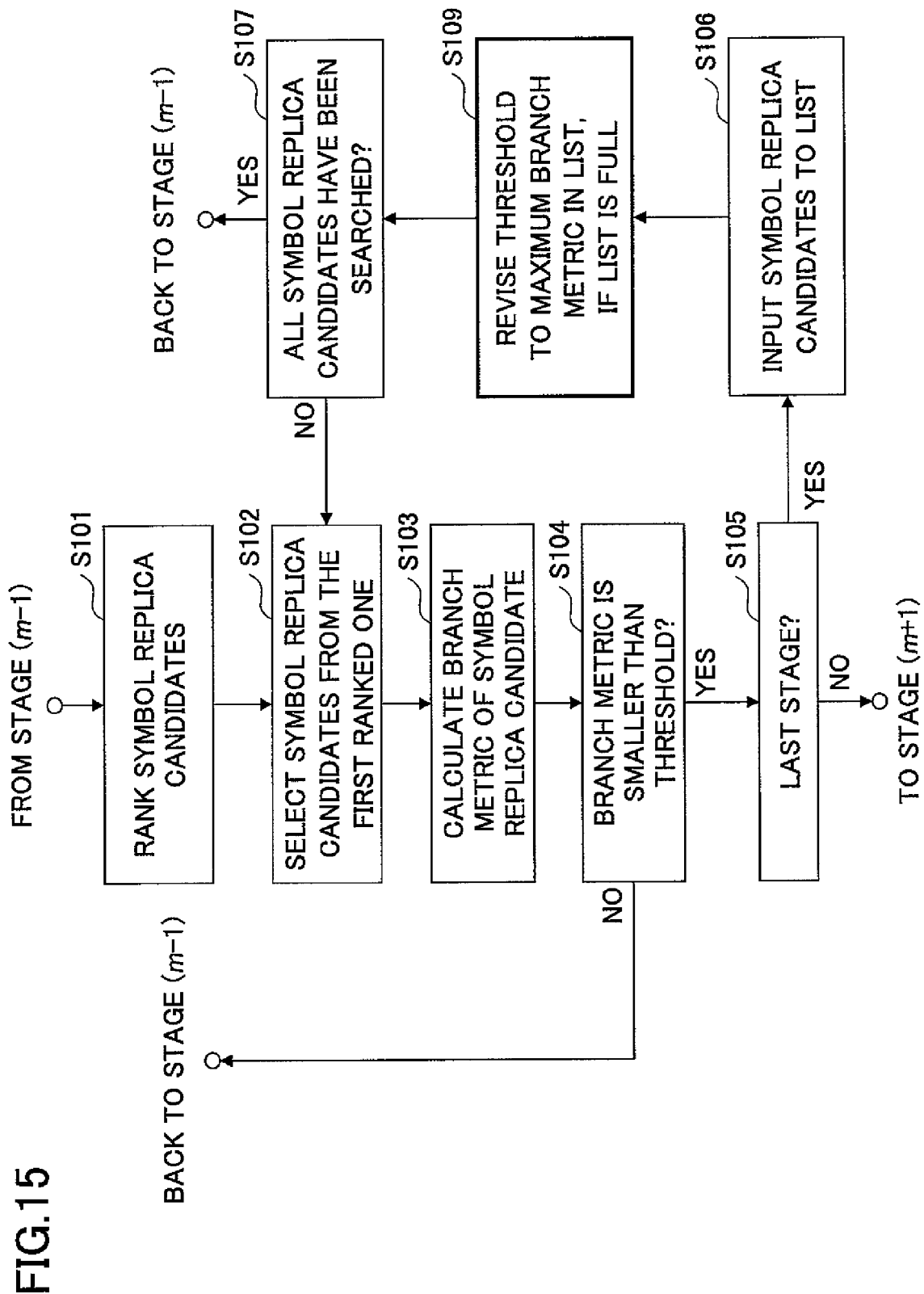
FIG. 15 is a flowchart showing further another example procedure in the LSD processing unit.

Next, FIGS. 14 and 15 relate to an improved feature of the management mechanism of the list that holds some symbol replica candidates to perform soft-decision turbo decoding later. In the above examples, when adding a new symbol replica candidate to the list at the final stage, the new symbol replica candidate is added to the list if the list is not full. On the other hand, if the list is full, the new symbol replica candidate is compared with the maximum branch metric in the list. Only if the new symbol replica candidate is smaller than the maximum branch metric in the list does the new symbol replica candidate replace the symbol replica candidate with the maximum branch metric. Accordingly under the situation where the list is already filled with symbol replica candidates with small branch metrics, performing new branch metric calculations and comparisons may be time-consuming and useless because they might not be added to the list. In order to solve this time-consuming problem, a scheme is proposed in which the threshold is revised when the list becomes full.

FIG. 14 shows a list 260 that holds the remaining symbol replica candidates at the final stage. FIG. 15 is a flowchart showing further another example procedure in the LSD processing unit 250. In FIG. 15, a new step S109 is added after step S106 where the symbol replica candidates are input to the list. At step S109, if the list is filled with symbol replica candidates, the threshold is changed to the maximum branch metric held in the list 260.

In this manner, by revising the threshold to the maximum branch metric in the list, it is possible to eliminate branch metric calculations and comparisons for symbol replica candidates that cannot be input on the list, reducing the calculation amount.

Figure 16:
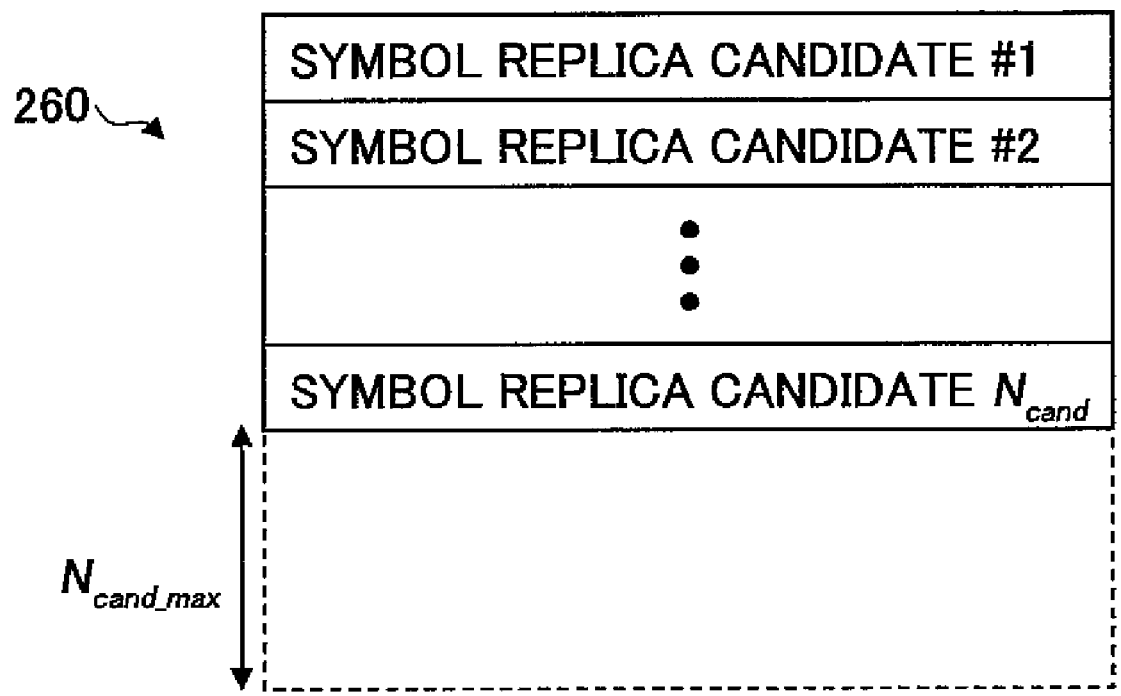
FIG. 16 shows another example list holding symbol replica candidates surviving at the last stage.
Figure 17:
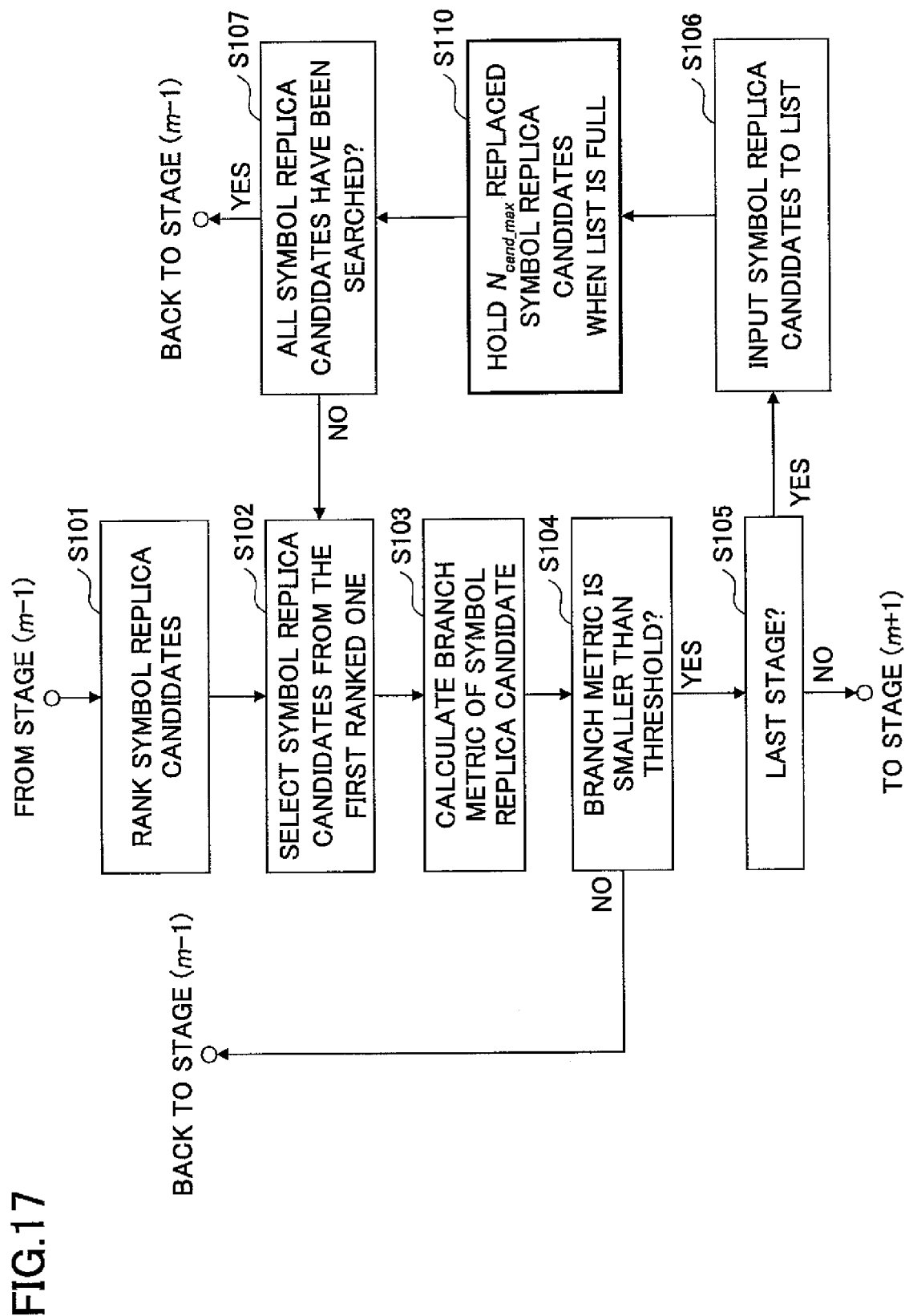
FIG. 17 is a flowchart showing further another example procedure in the LSD processing unit.

FIGS. 16 and 17 show another improvement in the managing mechanism of the list 260. In the above example, when adding a new symbol replica candidate to the list at the final stage, the symbol replica candidate is simply added if the list is not full. On the other hand, if the list is already full, the new symbol replica candidate is compared with the maximum symbol replica candidate in the list. If it is determined that the new symbol replica candidate is smaller than the maximum symbol replica candidate in the list, the maximum symbol replica candidate is replaced by the new symbol replica candidate. The replaced symbol replica candidate is thrown away. The thrown away symbol replica candidate cannot be used any longer in a later decoding process, even if the candidate may be effective for improving signal separation characteristics and for reducing the calculation amount.

In this example shown in FIGS. 16 and 17, all the replaced symbol replica candidates are not thrown away, and a certain number of such candidates are held for possible use.

FIG. 16 shows an example of the list 260 that holds the symbol replica candidates remaining at the final stage. The list 260 shown in FIG. 16 is provided with entries for the replaced $N_{cand\_max}$ symbol replica candidates in addition to entries #1~#$N_{cand}$ for the normal symbol replica candidates.

FIG. 17 is a flowchart showing a procedure in the LSD processing unit 250 in this example. There is provided a new step S110 after step S106 where symbol replica candidates are input to the list 260. At step S110, if the list is filled with symbol replica candidates, the replaced symbol replica candidates are held up to $N_{cand\_max}$ replaced candidates.

Figure 19:
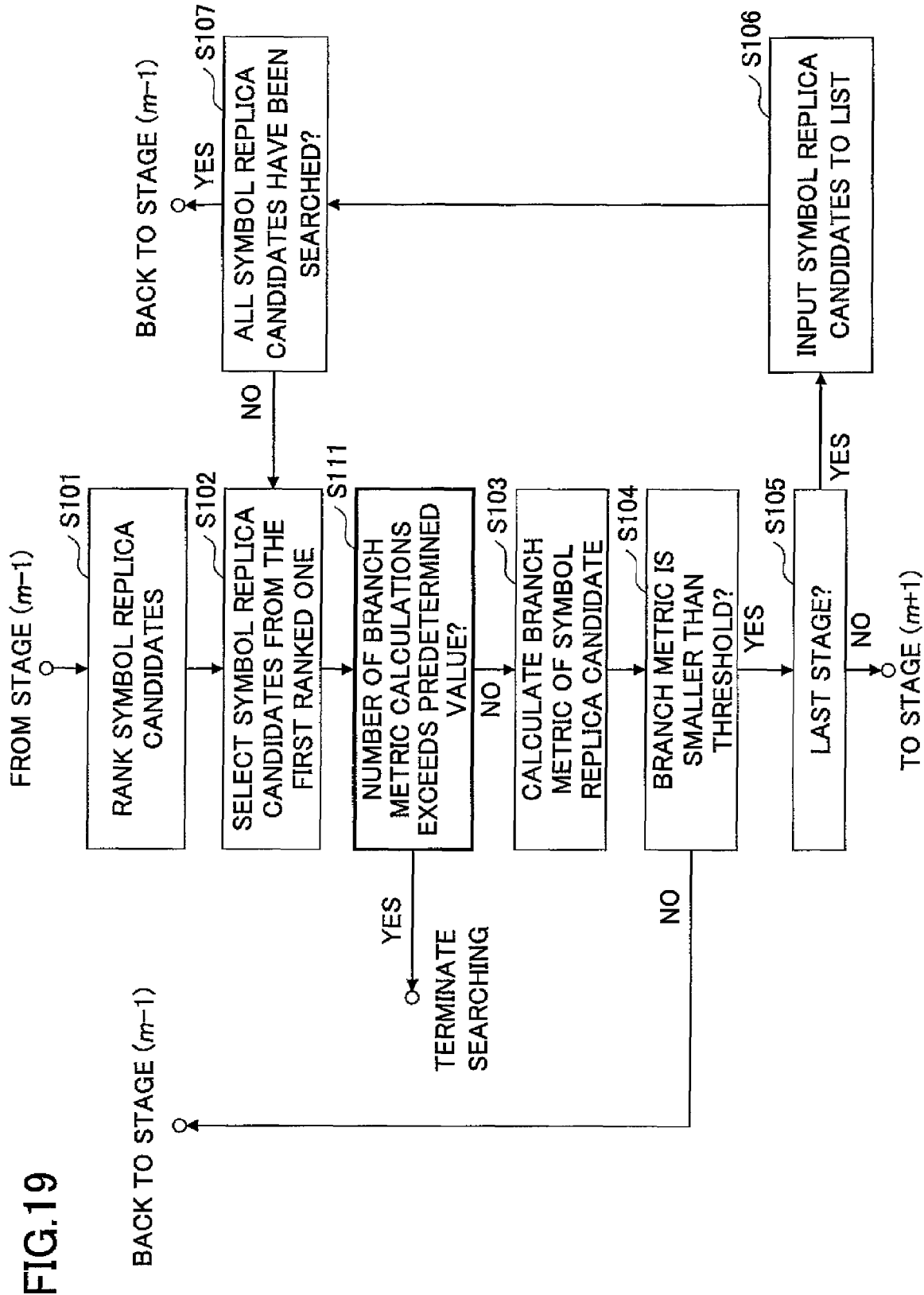
FIG. 19 is a flowchart showing further another example procedure in the LSD processing unit.

FIGS. 18 and 19 relate to an improvement in the total calculation amount. In the prior art, as shown in FIG. 18(a), searches are done for all symbol replica candidates whose branch metrics are smaller than the threshold. Therefore, an average calculation amount and the maximum calculation amount are much different from each other and there is a large variation width (gap) between them. Calculation time required until finishing the symbol search widely varies as shown in FIG. 18(a) depending on reception condition, and that is a problem. One scheme to solve this problem is to define an upper limit in the calculation amount at a level lower than the maximum calculation amount to reduce the variation width.

FIG. 19 is a flowchart showing further another example procedure in the LSD processing unit 250. There is provided a new step S111 after step S102 where symbol replica candidate selection is performed. At step S111, it is determined whether the number of all branch metric calculations through all stages exceeds a predetermined value. If the number of all branch metric calculations through all stages exceeds the predetermined value, the searching procedure is terminated.

In this manner, by terminating the searching procedure when the predetermined value is reached, the calculation amount does not vary depending on reception condition.

The present invention is not limited to these embodiments, but variations and modifications may be made without departing from the scope of the present invention.

The present application is based on Japanese Priority Application No. 2005-84697 filed on Mar. 23, 2005 with the Japanese Patent Office, the entire contents of which are hereby incorporated by reference.

What is claimed is:

1. A receiver in a MIMO multiplexing communication system in which plural signals are simultaneously transmitted from plural transmitting antenna branches using the same frequency, and the transmitted signals are retrieved by receiving the signals at plural receiving antennas, separating the received signals and searching for proper symbol metrics for each branch, comprising:

a QR decomposer for QR decomposing the received signals to orthogonalize the transmitted signals;

a symbol replica candidate ranking unit for subtracting surviving symbol replica candidates from the QR decomposed received signals to get remaining received signals and rank the remaining signals in increasing order of expected branch metrics of the remaining received signals;

a symbol replica candidate selector for selecting the symbol replica candidates in the ranked order;

a branch metric calculator for calculating the branch metrics of the selected symbol replica candidates; and a threshold comparator for comparing the calculated branch metrics with a predetermined threshold;

wherein if one of the calculated branch metrics is larger than the predetermined threshold, the one of the calculated branch metrics and successive branch metrics are deleted without further searching.

2. The receiver as claimed in claim 1, wherein:
the symbol replica candidate ranking unit performs quadrant detection by determining in which quadrant of orthogonal coordinates of a signal layout one of the remaining signals exists, repeating the determination by narrowing an area of the quadrant detections getting a spatial relationship of the one of the remaining signals in the signal layout and determining a branch metric size based on the spatial relationship.

3. The receiver as claimed in claim 1, wherein:
when it is determined that a calculated branch metrics is larger than the predetermined threshold, further searching for a predetermined number of symbol replica candidates is performed without terminating immediately.

4. The receiver as claimed in claim 1, wherein:
symbol replica candidates whose branch metrics are smaller than the threshold are input into a list, and after the list is full, a new symbol replica candidate to be added to the list is compared with the symbol replica candidate in the list having the largest branch metric, and if the former is smaller than the latter, then the former replaces the latter and the threshold is revised to be the largest branch metric.

5. The receiver as claimed in claim 1, wherein:
symbol replica candidates whose branch metrics are smaller than the threshold are input into a list, and after the list is full, a new symbol replica candidate to be added to the list is compared with the symbol replica candidate in the list having the largest branch metric, and if the former is smaller than the latter, then the former replaces the latter and a predetermined number of the replaced symbol replica candidates are still held in the list.

6. The receiver as claimed in claim 1, wherein:
the searching for symbol replica candidates is terminated when a predetermined calculation amount is reached.

7. The receiver as claimed in claim 1, further comprising:
a channel estimator for performing channel estimation based on orthogonal pilot signals contained in the received signals;
a transmitted signal ranking unit for ranking the transmitted signals in decreasing order of their received SINR based on the channel estimation.

8. The receiver as claimed in claim 7, wherein:
the orthogonal pilot signals are multiplexed with the transmitted signals by any of or a combination of time division multiplexing, frequency division multiplexing, and code division multiplexing.

9. A signal separation method in a MIMO multiplexing communication system in which plural signals are simultaneously transmitted from plural transmitting antenna branches using the same frequency, and the transmitted signals are retrieved by receiving signals at plural receiving antennas, separating the received signals and searching for proper symbol metrics for each branch, comprising the steps of:
QR decomposing the received signals to orthogonalize the transmitted signals;
subtracting surviving symbol replica candidates from the QR decomposed received signals to get remaining received signals;
ranking the remaining signals in the increasing order of expected branch metrics of the remaining received signals;
selecting symbol replica candidates in the ranked order;
calculating the branch metrics of the selected symbol replica candidates; and
comparing the calculated branch metrics with a predetermined threshold;
wherein if one of the calculated branch metrics is larger than the predetermined threshold, the one of the calculated branch metrics and successive branch metrics are deleted without further searching.

* * * * *

UNITED STATES PATENT AND TRADEMARK OFFICE
CERTIFICATE OF CORRECTION

| | | |
|---|---|---|
| PATENT NO. | : 7,864,897 B2 | Page 1 of 1 |
| APPLICATION NO. | : 11/909607 | |
| DATED | : January 4, 2011 | |
| INVENTOR(S) | : Noriyuki Maeda et al. | |

It is certified that error appears in the above-identified patent and that said Letters Patent is hereby corrected as shown below:

In Claim 2, column 11, line 2 the word "detections" should read --detection,--.

Signed and Sealed this
Tenth Day of May, 2011

David J. Kappos
*Director of the United States Patent and Trademark Office*